April 23, 1929.　　　P. M. GRANT　　　1,710,054
FLUID PRESSURE OPERATED VALVE
Filed Feb. 17, 1927
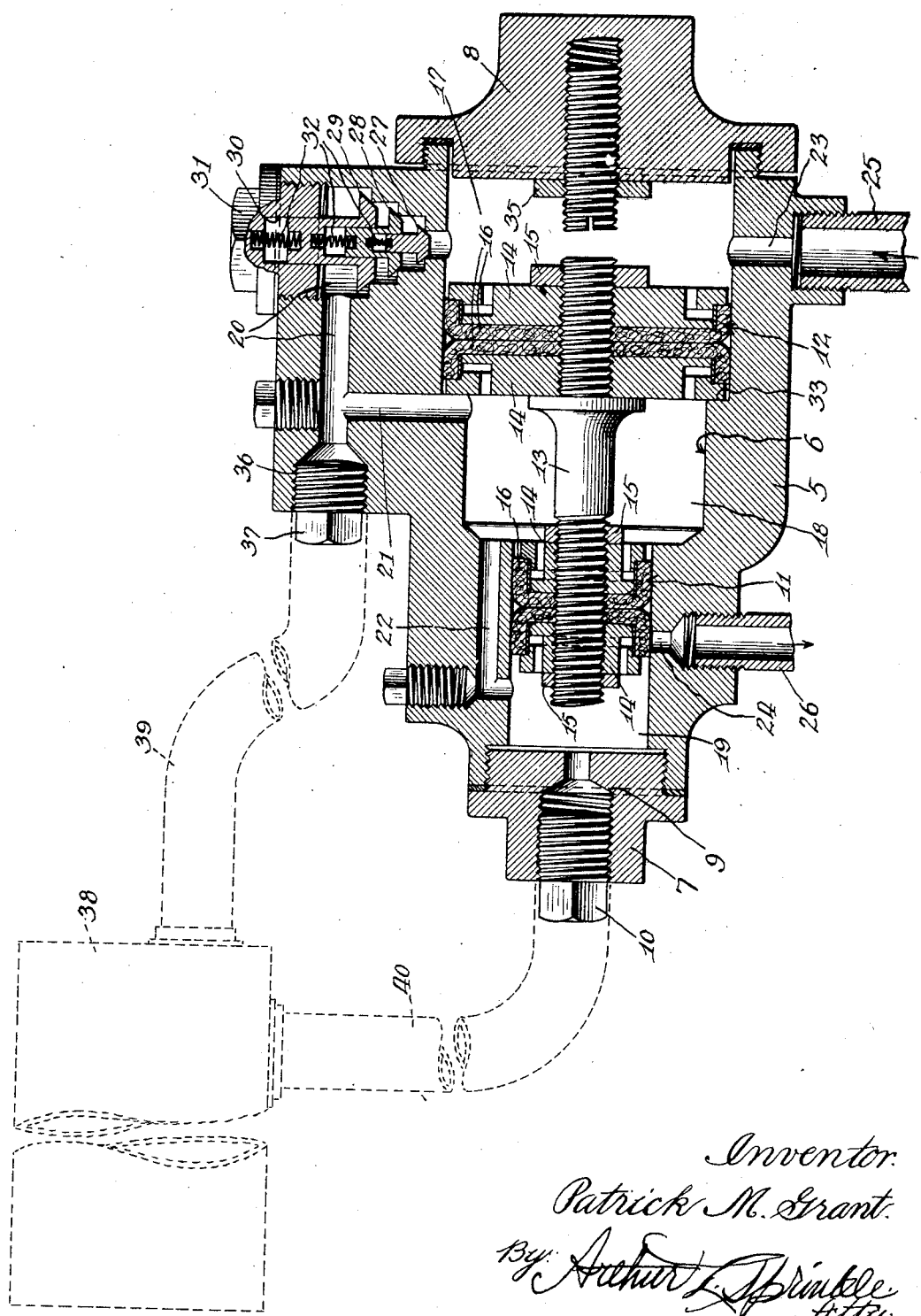
Inventor:
Patrick M. Grant.
By Arthur L. Sprinkle
Atty.

Patented Apr. 23, 1929.

1,710,054

UNITED STATES PATENT OFFICE.

PATRICK M. GRANT, OF CHICAGO, ILLINOIS.

FLUID-PRESSURE-OPERATED VALVE.

Application filed February 17, 1927. Serial No. 168,876.

This invention relates to fluid pressure operated valves and is particularly adaptable for use in connection with signalling devices, as, for example, in connection with air brake systems used in railroads, and will be described as employed in that connection.

One of the objects of the present invention is to provide a construction whereby an audible signal such as a whistle or the like will be automatically controlled, as in the present instance, by the fluid pressure maintained in the train line.

Another object of the invention is to provide means for adjusting the valve control elements to enable the proper positioning of various parts in a manner to facilitate the assembling of the device, and to obtain the maximum of efficiency.

Another object of the invention is to provide, in combination with other features, an adjustable stop for limiting the movement of the valve controlling elements in order to maintain the proper relation of parts and insure the effectual operation of the device.

Another object of the invention is to provide means whereby, if desired, an additional supply of fluid pressure may be maintained for actuating a whistle or the like.

A further object of the invention is to provide a novel construction and arrangement of fluid pressure retaining means for obtaining the maximum efficiency in the operation of the device.

A still further object of the invention is to provide suitable means for effectually actuating the fluid pressure retaining means.

One embodiment of the invention is shown, for illustrative purposes, in the accompanying drawing which represents a longitudinal sectional elevation through the devices, and illustrates diagrammatically, supplemental or auxiliary means for containing additional fluid pressure to be used in the operation of the valve and whistle or other signal device.

Referring to the drawing, the illustrative embodiment of the invention shown comprises a housing 5 adapted to be positioned in the cab of a locomotive or the like, said housing having a longitudinal bore 6 of various diameters formed therein and having its opposite ends screw threaded to receive the plug 7 and cap 8, respectively, the plug 7 being provided with an aperture 9 having internal screw threads adapted to receive a solid plug 10 for purposes hereinafter described.

Mounted to slide longitudinally in the bore 6 are a pair of preferably different sized pistons 11 and 12 mounted on, and connected together by a rod 13 having its opposite ends screw threaded to receive the plates 14 and jam nuts 15 for securing the gaskets 16 in proper position. The piston shown is of the type covered by my Patent No. 1,414,463 issued May 2, 1922, the pistons herein shown having gaskets adapted to effectually resist the passage of fluid pressure in either direction. The position of the pistons 11 and 12 in the bore 6 forms, in effect, partition walls extending transversely of the bore and provides chambers 17, 18 and 19 within the housing 5, which is also provided with communicating passages or ports 20 and 21 for connecting the chambers 17 and 18, and with a passage 22 for connecting the chambers 18 and 19. The housing 5 is also provided with an inlet port 23 and outlet port 24, the former communicating with the chamber 17 and being connected by means of a pipe 25 with the train line of an air brake system or the like in which a supply of fluid pressure is maintained for operating the braking mechanism, while the port 24 communicates with the chamber 19 and is adapted to be connected by means of a pipe 26 to a whistle or other suitable signalling device. It will be noted that the smaller piston 11 in the illustrative device is adapted to cover and uncover the port 24 to permit fluid pressure in the chambers 18 and 19 to pass to the pipe 26 and thence to the signalling device.

Interposed between the chambers 17 and 18 and positioned preferably in the passage 20 is a novel form of pressure retaining means adapted to function after the manner of a check valve and which comprises a plurality of tapered valves 27, 28 and 29 of various sizes or diameters adapted to co-operate with valve seats of suitable or corresponding dimensions formed in the housing. The valve stems of the valves 27 and 28 are adapted to be slidably received by sockets formed in adjacent valves in nested relationship with respect to each other, while the stem of the valve 29 is slidably positioned in a socket 30 formed in a screw plug 31, screw threaded into the housing 5 and forming a closure for a portion of the passage 20 and a primary or main valve guide for the nested valves 27, 28 and 29.

Interposed between the valves 27, 28 and 29 and their respective guide members are springs 32 tending to separate the various valves and position them snugly on their respective valve seats. It will be observed that by such a construction of pressure retaining means, the possible escape of back pressure is practically eliminated by reason of the plurality of pressure retaining elements and provides a neat and compact arrangement capable of quick assembling and insuring maximum efficiency in the operation of the valve.

In the operation of the device as thus far described, the fluid under pressure from the train line enters the chamber 17 through the pipe 25 and opens the valves 27, 28 and 29, thereby permitting the fluid to pass through the ports 20 and 21 into the chamber 18, and thence through the passage or port 22 into the chamber 19 until the maximum pressure of the train line is uniformly distributed in the various chambers, after which the pressure retaining means will close to prevent the escape of any back pressure from the chambers 18 and 19 into the chamber 17, it being understood, of course, that the pressure of the train line upon entering the chamber 17 will have forced the piston 12 against the stop 33 formed on the housing, and the piston 11 will have moved past the port 24 in a manner to close the port and prevent the escape of fluid pressure from the chambers 18 and 19 into the pipe 26. So long as the pressure in the train line is maintained the pistons 11 and 12 will remain in the positions shown in the drawing, but, if for any reason, the train line is "bled" or the pressure therein reduced, for example, in the case of a break in the line due to parting of the train, or the giving of a rope signal by a member of the train crew, thereby reducing the pressure in the chamber 17, the maximum train pressure retained within the chambers 18 and 19, by reason of the closing of the valves 27, 28 and 29, will force the pistons longitudinally of the bore in a manner to uncover the port 24 and permit the fluid pressure within the chambers 18 and 19 to pass through the said port into the pipe 26 and thence to the whistle or other signalling device, thereby warning the engineer of the train, or other operator, of abnormal conditions in the system. After the condition has been corrected, and suitable operating pressure restored in the train line the pressure upon entering the chamber 17 will force the pistons longitudinally of the bore in the opposite direction by reason of the then reduced pressure in the chambers 18 and 19 and cause the piston 11 to cover the port 24 as shown in the drawing, after which the pressure in the chamber 17 will pass the pressure retaining means and into the chambers 18 and 19 until uniform pressure is obtained in all of the chambers and the pistons will remain in a position to cover the port 24 until the line is again "bled" or the pressure therein reduced.

To limit the movement of the pistons in one direction and to insure unobstructed passage of the train line pressure into the chamber 17 and thence to the chambers 18 and 19, the plug 8 is provided with an adjustable stop 34 adapted to be screw threaded therein and positioned in a manner to be engaged by the end of the rod 13 when the pistons have reached a predetermined position, which will be such as to prevent the piston 12 from covering the port 23 and the opening connecting the chamber 17 with the passage 20. The stop 34 may be provided with a jam nut 35 for securely locking the stop in adjusted position.

The housing 5 may be provided adjacent the passage 20 with a screw threaded port 36 shown in the present instance as closed by a plug 37. In such an arrangement, and with the plug 10 positioned in the aperture 9 of the plug 7, the fluid pressure in the chambers 18 and 19 will be relied upon to shift the pistons longitudinally of the bore 6 and to actuate the whistle or other signalling device when the pressure in the train line is reduced. In the event that an additional supply of fluid is desired for shifting the pistons and actuating the signalling device, a fluid pressure supply receptacle 38 (indicated diagrammatically in dotted lines) may be employed and connected with the chambers 18 and 19 by means of pipes 39 and 40, respectively, the pipe 39 being inserted in the port 36 after the removal of the plug 37 and the pipe 40 screw threaded into the apertured plug 7 after removing the plug 10.

It will be noted that by such an arrangement the pressure of the train line, in addition to filling the chambers 18 and 19, will store up an additional or auxiliary supply of fluid pressure in the receptacle 38, thereby providing an additional supply for prolonging the actuation of the signalling device.

From the foregoing specification it will be observed that my invention provides an entirely automatic fluid pressure controlled valve of maximum efficiency, capable of being easily assembled and providing suitable adjusting means for accurately positioning the various elements to obtain the most efficient results.

Obviously, the present invention is not limited to the precise construction and arrangement shown and described, as the same may be variously modified without departing from the spirit and scope of the invention as set forth in the appended claims. Moreover, all the features of the invention need not be used conjointly, as the same may be used to advantage in variously different combinations and sub-combinations.

What I claim as my invention and desire to secure by Letters Patent is:

1. A pressure operated valve comprising a housing having a longitudinal bore formed therein and having passages and inlet and outlet ports communicating with said bore, means for closing the ends of said bore, a plurality of members mounted in said bore and adapted to form a plurality of communicating chambers in said housing, means for admitting fluid under pressure to said passages and chambers, and means for preventing the escape of fluid from certain of said chambers to the other of said chambers, said members being movable in said bore for permitting the escape of fluid from certain of said chambers through said outlet port upon the reduction of pressure in certain other of said chambers.

2. A pressure operated valve comprising a housing having a longitudinal bore formed therein and having passages and inlet and outlet ports communicating with said bore, means for closing the ends of said bore, a plurality of members mounted in said bore and adapted to form a plurality of chambers in said housing, means for admitting fluid under pressure to said passage and chambers, means for preventing the escape of fluid from certain of said chambers to the other of said chambers, said members being movable in said bore permitting the escape of fluid from certain of said chambers through said outlet port upon the reduction of pressure in certain other of said chambers, and adjustable means for limiting the movement of said members.

3. A pressure operated valve comprising a housing having a longitudinal bore, passages and inlet and outlet ports formed therein, means for closing the ends of said bore, a plurality of members mounted in said bore and adapted to form a plurality of communicating chambers in said housing, means for admitting fluid pressure to said passages and chambers, and means for preventing the escape of back pressure from certain of said chambers, said members being movable in said bore for permitting the escape of pressure from certain of said chambers through said outlet port upon the reduction of fluid pressure in certain other of said chambers.

4. A pressure operated valve comprising a housing having a communicating longitudinal bore, passages and outlet port formed therein, means for closing the ends of said bore, a plurality of connected members mounted in said bore and adapted to form a plurality of communicating chambers in said housing, one of said members being adapted normally to cover said port, means for admitting fluid under pressure to said chambers and passages and means for preventing the escape of back pressure from certain of said chambers, said members being movable in said bore for covering and uncovering said port according to the relative degree of pressure in the respective chambers.

5. A pressure operated valve comprising a housing having a longitudinal bore, passages and an outlet port formed therein, means for closing the ends of said bore, a plurality of members mounted in said bore and adapted to form a plurality of communicating chambers in said housing, means for admitting fluid under pressure to said chambers, a plurality of pressure retaining means for preventing the escape of back pressure from certain of said chambers, said members being movable in said bore for permitting the escape of pressure through said outlet port from certain of said chambers upon the reduction of fluid pressure in certain other of said chambers, and adjustable means for limiting the movement of said members.

6. A pressure operated valve comprising a housing having a communicating bore, passages and outlet port formed therein, means for closing the ends of said bore, a plurality of members mounted in said bore in a manner to form a plurality of communicating chambers in said housing, one of said members being adapted normally to cover said port, means for adjusting said port covering member with respect to said port, means for admitting fluid under pressure to said chambers, a plurality of aligned pressure retaining means interposed between certain of said chambers, said members being movable in said bore to permit the escape of fluid pressure through said outlet port from certain of said chambers upon the reduction of pressure in certain other of said chambers, and means for limiting the movement of said members.

7. A pressure operated valve comprising a housing having a communicating bore, passages and outlet port formed therein, means for closing the ends of said bore, a plurality of connected members mounted in said bore in a manner to form a plurality of communicating chamers in said housing, one of said members being adapted normally to cover said port, means for admitting fluid under pressure to said chambers, a plurality of nested pressure retaining valves interposed between certain of said chambers, resilient means tending to separate and seat said valves, said members being movable in said bore to permit the escape of fluid pressure through said outlet port from certain of said chambers upon the reduction of pressure in certain other of said chambers, and adjustable means for limiting the movement of said members.

8. A pressure operated valve comprising a housing having a longitudinal bore formed therein and provided with inlet and outlet ports communicating with said bore, closures positioned in the ends of said bore, one of said closures having an aperture therein, a plurality of pistons mounted in said bore in a manner to form a plurality of chambers in the housing, said housing having passages or ports connecting said chambers, said pistons being connected together and adjustable with respect to each other, one of said pistons being adapted normally to cover said outlet port and capable of being adjusted with respect thereto, means for admitting fluid under pressure to said chambers through said inlet port, a plurality of nested and aligned pressure retaining valves interposed between certain of said chambers, said pistons being movable in said bore for covering and uncovering said outlet port according to the relative degree of pressure in the respective chambers, and means for limiting the movement of said pistons.

9. A pressure operated valve comprising, in combination, a housing having a longitudinal bore and an outlet port communicating therewith, means for closing the ends of said bore, a plurality of connected members mounted in said bore and adapted to form a plurality of chambers in said housing, said housing having a plurality of passages formed therein and communicating with said chambers, means for admitting fluid under pressure through said passages to said chambers, and means for preventing the escape of back pressure from certain of said chambers to other chambers, said members being movable in said bore for covering and uncovering said outlet port according to the relative degree of pressure in the respective chambers.

10. A pressure operated valve comprising, in combination, a housing having a longitudinal bore and an outlet port communicating therewith, means for closing the ends of said bore, a plurality of connected members mounted in said bore and adapted to form a plurality of chambers in said housing, said housing having a plurality of passages formed therein and communicating with said chambers, a fluid pressure supply receptacle communicating with said passages and chambers, means for admitting fluid under pressure through said passages to said chambers, and a check valve positioned in one of said passages for preventing the escape of back pressure from certain of said chambers to other chambers, said members being movable in said bore for covering and uncovering said outlet port according to the relative degree of pressure in the respective chambers.

In testimony whereof I have signed my name to this specification on this 31st day of January, A. D. 1927.

PATRICK M. GRANT.